US010927837B2

(12) United States Patent
Clements

(10) Patent No.: US 10,927,837 B2
(45) Date of Patent: Feb. 23, 2021

(54) REGENERATIVE PUMP START STAGE FOR HIGH SPEED CENTRIFUGAL FUEL PUMP

(71) Applicant: EATON INTELLIGENT POWER LIMITED, Dublin (IE)

(72) Inventor: Martin A. Clements, West Chester, OH (US)

(73) Assignee: EATON INTELLIGENT POWER LIMITED, Dublin (IE)

(*) Notice: Subject to any disclaimer, the term of this patent is extended or adjusted under 35 U.S.C. 154(b) by 363 days.

(21) Appl. No.: 15/771,699

(22) PCT Filed: Nov. 2, 2016

(86) PCT No.: PCT/US2016/060127
§ 371 (c)(1),
(2) Date: Apr. 27, 2018

(87) PCT Pub. No.: WO2017/079309
PCT Pub. Date: May 11, 2017

(65) Prior Publication Data
US 2018/0347570 A1 Dec. 6, 2018

Related U.S. Application Data

(60) Provisional application No. 62/250,163, filed on Nov. 3, 2015.

(51) Int. Cl.
F04D 29/22 (2006.01)
F04D 5/00 (2006.01)
F04D 29/18 (2006.01)
F04D 13/12 (2006.01)
F04D 1/00 (2006.01)
F04D 15/00 (2006.01)
F04D 9/04 (2006.01)
(Continued)

(52) U.S. Cl.
CPC ............. F04D 5/002 (2013.01); F02C 7/26 (2013.01); F04D 1/003 (2013.01); F04D 9/04 (2013.01); F04D 13/12 (2013.01); F04D 15/005 (2013.01); F04D 15/0072 (2013.01); F04D 29/188 (2013.01); F04D 29/22 (2013.01); F04D 29/106 (2013.01); F05D 2210/11 (2013.01); F05D 2220/323 (2013.01); F05D 2260/85 (2013.01)

(58) Field of Classification Search
None
See application file for complete search history.

(56) References Cited

U.S. PATENT DOCUMENTS 3,576,375 A     4/1971  Jackson
3,936,240 A *   2/1976  Dochterman ........... F04D 17/12
                                                 417/368
2012/0156066 A1  6/2012  Clements

OTHER PUBLICATIONS

PCT/US2016/060127 International Search Report and Written Opinion, Prepared by the European Patent Office, dated Feb. 22, 2017.

* cited by examiner

Primary Examiner — Kayla Mccaffrey
(74) Attorney, Agent, or Firm — Fay Sharpe LLP

(57) ABSTRACT

A centrifugal pump includes a selectable regenerative style pumping element, including a regenerative pump rotor and at least one side wall flow channel formed by a rotating disc. The regenerative pumping element is selectable between a first state in which the disc does not rotate with the impeller and a second state in which the disc rotates with the impeller.

16 Claims, 2 Drawing Sheets

(51) Int. Cl.
*F02C 7/26* (2006.01)
*F04D 29/10* (2006.01)

REGENERATIVE PUMP START STAGE FOR HIGH SPEED CENTRIFUGAL FUEL PUMP

This application claims the priority benefit of U.S. provisional application Ser. No. 62/250,163, filed Nov. 3, 2015, the entire disclosure of which is expressly incorporated herein by reference.

BACKGROUND

Centrifugal type fuel pumps would be ideal for application in a modern day jet engine fuel system if the limitation of starting the engine could be overcome. A centrifugal pump produces pressure as a function of its rotating speed squared. In a typical centrifugal pump application, not enough pump output pressure is generated to start the engine when the pump is rotated at typical starting speeds (i.e. less than around 20%-30% of operating speed where operating speed is, for example, from about 20,000 rpm to about 40,000 rpm and thus starting speed may range from about 4000 rpm to about 12,000 rpm).

Thus a need exists for providing an effective pump start stage for a centrifugal pump, and particularly one useful in a jet engine fuel system.

SUMMARY

A centrifugal pump includes a selectable regenerative style pumping element that is selectable between a first state in which the disc does not rotate with the impeller and a second state in which the disc rotates with the impeller.

More particularly, the centrifugal pump includes a housing that receives a centrifugal element having an impeller that rotates about a rotational axis relative to the housing. The selectable regenerative style pumping element is operatively associated with the centrifugal element and includes a regenerative pump rotor formed as part of the impeller. At least one side wall flow channel is formed by a rotating disc, wherein the regenerative pumping element is selectable between a first state in which the disc does not rotate with the impeller and a second state in which the disc rotates with the impeller.

The regenerative pumping rotor includes regenerative pumping blades that receive flow exiting the impeller.

The rotating disc is supported radially between the impeller and the housing by a disc bearing.

A brake mechanism is interposed between the rotating disc and the housing to control selective rotation of the disc between the first state and the second state.

The brake mechanism includes first and second brakes spaced along the rotational axis on opposite sides of the impeller.

The first and second brakes when actuated apply a friction force against faces of the rotating disc.

The pump includes a second rotating disc wherein the first and second discs are spaced along the rotational axis on opposite sides of impeller.

A regenerative pump inlet and a regenerative pump outlet of the regenerative pump are located approximately 180 degrees apart.

First and second side flow channels extend through the first and second rotating discs, respectively.

The rotating disc includes a portion radially received between an outlet of the impeller and an inlet to a diffuser in the housing.

Flow from the impeller is divided between the diffuser and the at least one side wall flow channel.

A method of operating a centrifugal pump includes providing a housing with a cavity sized to receive a centrifugal element having an impeller therein, and providing a selectable regenerative pumping element incorporated with a centrifugal element, the pumping element and centrifugal element including a regenerative pump rotor formed as part of the impeller and at least one side wall flow channel formed by a rotating disc.

The method further includes operating the regenerative pumping element between a first state in which the disc is not rotating and a second state in which the disc is rotating.

The method may include braking the disc to prevent rotation of the disc while the impeller is rotating in a first state and thereby supply pressurized fluid for engine start-up, and releasing the disc so the disc is rotating with the impeller in second state.

The method may further include dividing outlet flow from the impeller between a pump diffuser and the regenerative pumping element in the first state.

The method may further include directing outlet flow from the impeller to the pump diffuser in the second state.

A preferred aspect of the method includes dividing outlet flow from the impeller between a pump diffuser and the regenerative pumping element in the first state and directing outlet flow from the impeller to the pump diffuser in the second state.

A primary benefit of the present disclosure is the ability to provide an effective pump start stage in a jet engine.

Another advantage resides in providing an effective pump start stage for a centrifugal pump.

Still other benefits and advantages will become apparent to one skilled in the art upon reading and understanding the following detailed description.

DETAILED DESCRIPTION

Figure 1:
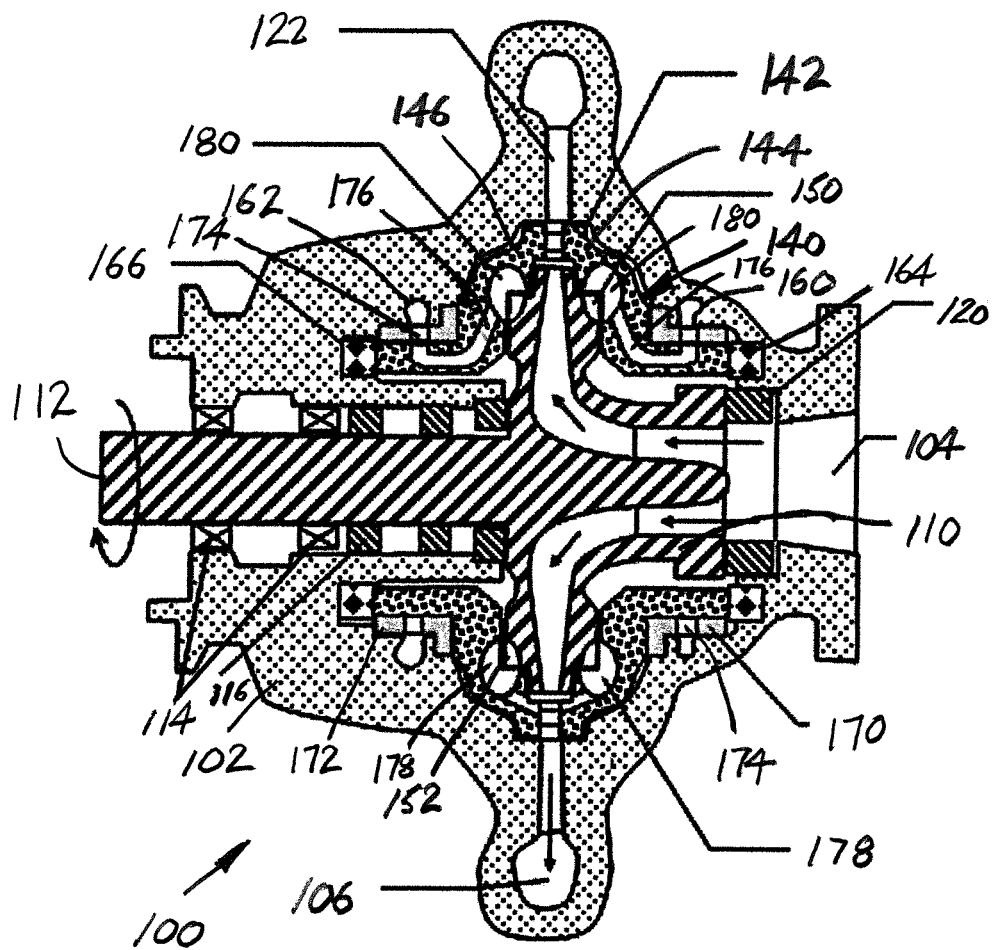
FIG. 1 is a cross-sectional view of an embodiment of a pump embodying teachings of the present invention.

Referring now to the drawings, which are not intended to limit the invention, FIG. 1 illustrates a centrifugal pump 100 that has a housing 102 with a pump inlet 104 and a pump discharge for outlet 106. The housing receives a high speed, centrifugal element that includes an impeller 110 that is rotated by a drive shaft 112. Conventional pump bearings 114 support the drive shaft 112 that rotates the impeller 110 relative to the housing to impart energy, i.e. raises the pressure of the pumped fluid (e.g., fuel for example as used in a fuel pump for a jet engine) that the outlet 106 relative to the fluid pressure at the inlet 104. Shaft seals 116 are located in spaced relation between an outer surface of the rotating shaft and a wall portion of the housing 102 that forms an opening 118 that receives the shaft 112. Likewise, impeller seals 120 are interposed between the impeller 110 and the housing 102, preferably along a rear face of the impeller adjacent the interconnection between the impeller and the shaft 112, and between a front side of the impeller and the housing adjacent the inlet 104. In a manner well known in the art, fluid (e.g., fuel) enters the pump inlet 104, is pumped by the rotating impeller 110 and directed to a stationary diffuser 122 so that the fluid is pressurized as the fluid is discharged through the stationary diffuser 122 that communicates with the pump discharge 106.

A regenerative-style pumping element 140 is incorporated into the high speed centrifugal elements described above. The regenerative pumping element 140 includes a regenerative pump rotor that is formed by a rotating disc 142 that includes first and second rotating discs or rotating disc portions 144, 146. As evident in FIG. 1, the rotating discs 144, 146 are dimensioned and generally radially received between the impeller 110 and the housing 102 on opposite axial sides (where the axial direction is defined as the rotational axis of the shaft 112 and impeller). The impeller 110 is modified to include regenerative pumping blades 150, 152, preferably the first regenerative pumping blade 150 being located on the front side of the impeller while the second regenerative pumping blade 152 is provided on the rear side of the impeller.

The housing 102 is modified to include outlet passages 160, 162 that receive a fluid pumped by the regenerative pumping blades 150, 152 when there is relative rotation between the impeller 110 and the disc set 142. Specifically, relative rotation between the impeller 110 and the disc set 142 is provided in a first state of the regenerative pump 140 when the disc set 142 is selectively held (e.g., prevented or inhibited from rotation) in place relative to the housing 102. The mechanism to achieve the holding action of the disc set 142 is provided by brake mechanism 164, 166 interposed between the disc set and the housing 102. The brake mechanism may be actuated in any conventional manner e.g., mechanically or electronically or electromechanically, to provide for selective first and second states of the regenerative pump. As noted above, when the brake mechanism 164, 166 is actuated, the disc set 142 is prevented from rotating and thus the impeller 110 rotates relative to the disc set and provides pressurized flow to outlets 160, 162. The pressurized flow to the outlets 160, 162 communicates with and provides output pressure to start the engine at typical starting speeds.

When the brake mechanism 164, 166 is deactuated, i.e., in the second state of the regenerative pump 140, the disc set 142 rotates with the impeller 110. In this manner, fluid exiting the impeller is passed through the disc set 142 and enters the diffuser 122 and pump outlet 106. Thus, in the second state, the disc set 142 rotates relative to the housing and is supported for rotation by rotating disc bearings 170, 172. Since the disc set 142 rotates with the impeller 110, the disc set does not add significantly to the energy imparted by the impeller to the pumped fluid in the second state.

Figure 2:
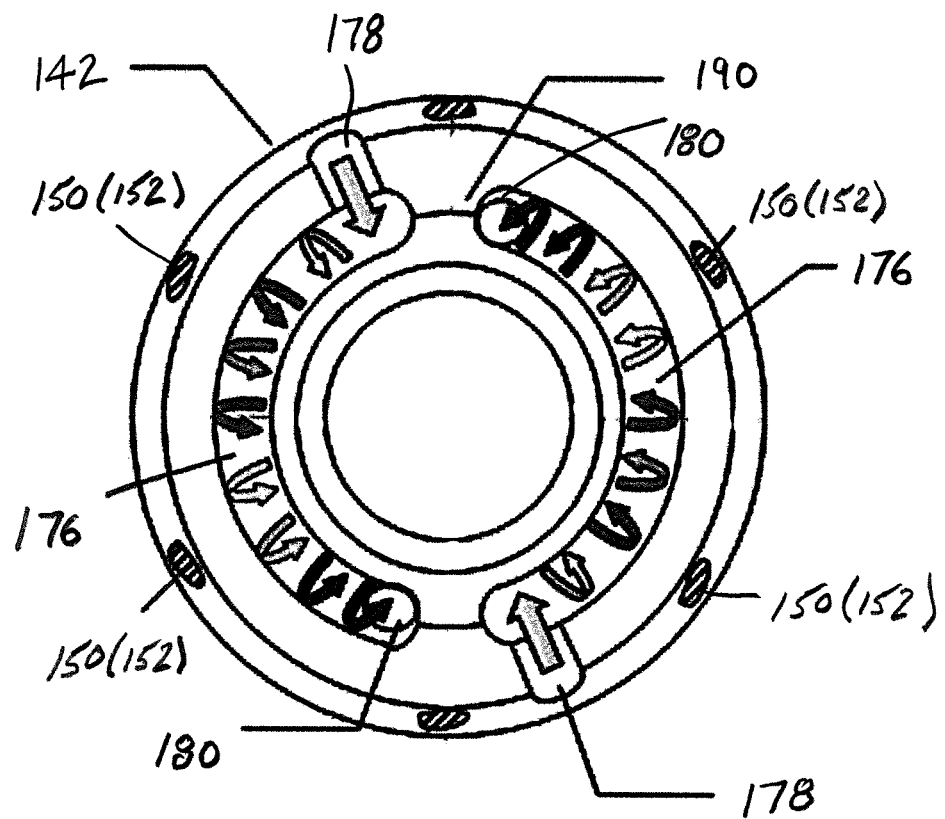
FIG. 2 is a font view of an embodiment of a pump embodying teachings of the present invention.

Each of the rotating disc bearings 170, 172 includes a passage or opening 174 therethrough that communicates with the respective regenerative pump outlet 160, 162. Further, the disc portions 144, 146 each include side flow channels 176 that extend from regenerative pump inlet flow ports 178 to regenerative pump outlet ports 180 (see FIGS. 1 and 2). A seal zone 190 separates the pair of side flow channels 176 in each disc set. In this manner, the regenerative pumping blades 150, 152 rotated relative to the disc set 142 in the first state of the regenerative pump 140 (i.e., when the brake mechanism is actuated). This advances a portion of the fluid exiting the rotating impeller into respective inlet flow ports 178 which then communicate with the side flow channels 176 and direct fluid to the outlet flow ports 180, through the openings 174 in the disc bearings 170, 172, and exits the housing 102 via regenerative pump outlets 160, 162 to supply the desired fluid pressure required for jet engine start-up.

In summary, the centrifugal pump 100 incorporates a regenerative pumping element 140 with the high-speed centrifugal elements, specifically impeller 110. A regenerative pump rotor 150, 152 is part of the high speed centrifugal pump impeller 110 while the side wall flow channels 176 are formed in a pair of rotating discs 144, 146. The regenerative pumping action becomes selectable by holding (e.g., prevent or inhibit rotation) the discs to pump fluid (first state) and allowing the discs to rotate with the impeller to halt the pumping action (second state). In the first state, flow from the impeller 110 is divided between the diffuser 122/pump outlet 106 and the at least one side wall flow channel 176. In the second state, outlet flow from the impeller is directed through the disc rotating with the impeller to the pump diffuser.

In another embodiment of the invention, the regenerative style pumping element may be employed without the high speed centrifugal elements. A selectable regenerative style pumping element includes a regenerative pump rotor and at least one side wall flow channel formed by a rotating disc. The regenerative pumping element is selectable between a first state in which the disc does not rotate and a second state in which the disc rotates.

Various embodiments are described herein to various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "some embodiments," "one embodiment," or "an embodiment," or the like, means that a particular feature, structure, or characteristic described in connection with the embodiment is included in at least one embodiment. Thus, appearances of the phrases "in various embodiments," "in some embodiments," "in one embodiment," or "in an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

Although only certain embodiments have been described above with a certain degree of particularity, those skilled in the art could make numerous alterations to the disclosed embodiments without departing from the scope of this disclosure. Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." throughout the specification is to be construed broadly and is used to provide non-limiting examples of embodiments of the disclosure, and the disclosure is not limited to such examples. The use of "connected"

or "connection" should be construed broadly and is intended to include, without limitation, direct or indirect physical connection and/or electrical connection (e.g., wired and/or wireless). It is intended that all matter contained in the above description or shown in the accompanying drawings shall be interpreted as illustrative only and not limiting. Changes in detail or structure may be made without departing from the present disclosure as defined in the appended claims.

What is claimed is:

1. A centrifugal pump, comprising:
   a housing;
   an impeller that rotates about a rotational axis relative to the housing;
   a selectable regenerative pumping element operatively associated with the impeller including a regenerative pump disc received between the impeller and housing; and
   at least one side wall flow channel formed by the rotating disc, wherein the regenerative pumping element is selectable between a first state in which the disc does not rotate with the impeller and a second state in which the disc rotates with the impeller.

2. The centrifugal pump of claim 1, wherein the impeller includes regenerative pumping blades that receive flow exiting the impeller.

3. The centrifugal pump of claim 2, wherein the rotating disc is supported radially between the impeller and the housing by a disc bearing.

4. The centrifugal pump of claim 3, further comprising a brake mechanism interposed between the rotating disc and the housing to control selective rotation of the disc between the first state and the second state.

5. The centrifugal pump of claim 4, wherein the brake mechanism includes first and second brakes spaced along the rotational axis on opposite sides of the impeller.

6. The centrifugal pump of claim 5, wherein the first and second brakes when actuated apply a friction force against faces of the rotating disc.

7. The centrifugal pump of claim 3, further comprising a second rotating disc wherein the first and second discs are spaced along the rotational axis on opposite sides of impeller.

8. The centrifugal pump of claim 7, wherein a regenerative pump inlet port and a regenerative pump outlet port of the regenerative pump disc are located approximately 180 degrees apart.

9. The centrifugal pump of claim 6, wherein the at least one side wall flow channel further comprises first and second side flow channels extending through the first rotating disc and the second rotating disc, respectively.

10. A centrifugal pump, comprising:
    a housing;
    an impeller rotatably received in the housing; and
    a regenerative pumping element operatively associated with the impeller including a regenerative pump rotor and at least one side wall flow channel formed by a rotating disc, wherein the regenerative pumping element is selectable between a first state in which the disc does not rotate and a second state in which the disc rotates.

11. The centrifugal pump of claim 10, wherein in the first state the impeller rotates relative to the disc to provide pressurized fluid for purposes of engine start-up.

12. The centrifugal pump of claim 11, further comprising a brake that is selectively applied for preventing rotation of the disc during the first state.

13. The centrifugal pump of claim 12, further comprising a regenerative pump bearing for allowing rotation of the disc with the impeller during the second state when the brake is released.

14. The centrifugal pump of claim 10, wherein the rotating disc of the regenerative pumping element includes a first rotating disc portion and a second rotating disc portion disposed on opposite axial sides of the impeller.

15. The centrifugal pump of claim 10, wherein the rotating disc includes a portion radially received between an outlet of the impeller and an inlet to a diffuser in the housing.

16. The centrifugal pump of claim 15, wherein flow from the impeller is divided between the diffuser and the at least one side wall flow channel.

* * * * *